United States Patent
Szabo

[19]

[11] Patent Number: 6,014,563
[45] Date of Patent: *Jan. 11, 2000

[54] RADIO SYSTEM FOR A CLOSED USER GROUP

[75] Inventor: Laszlo Szabo, Korntal, Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/682,675

[22] PCT Filed: Nov. 27, 1995

[86] PCT No.: PCT/EP95/04661

§ 371 Date: Sep. 23, 1996

§ 102(e) Date: Sep. 23, 1996

[87] PCT Pub. No.: WO96/17483

PCT Pub. Date: Jun. 6, 1996

[30] Foreign Application Priority Data

Nov. 29, 1994 [DE] Germany .................. 44 42 410

[51] Int. Cl.[7] .................. H04Q 7/26; H04Q 7/30; H04Q 7/38
[52] U.S. Cl. .................. 455/435; 455/463; 455/551; 455/552; 455/555; 455/560
[58] Field of Search .................. 455/411, 433, 455/438, 463, 552, 561, 435, 551, 560, 554, 555

[56] References Cited

U.S. PATENT DOCUMENTS 5,303,289  4/1994  Quinn ........................... 455/438
5,365,572  11/1994 Saegusa et al. .................. 455/463
5,438,608  8/1995  Kojima ........................... 455/411
5,459,761  10/1995 Monica et al. .................. 375/211
5,497,411  3/1996  Pellerin .......................... 455/411
5,537,474  7/1996  Brown et al. .................... 455/411

FOREIGN PATENT DOCUMENTS 0611006  8/1994  European Pat. Off. .
4307966  9/1994  Germany .
9400920  1/1994  WIPO .

OTHER PUBLICATIONS

"Mobilfunk Handbuch" J. Kedaj et al, Fig. 6–2/2, Dec. 1993.

Primary Examiner—Andrew M. Dolinar

[57] ABSTRACT

To implement a radio system (PRS) for a closed user group by simple means and at low cost, a device (MONE) is proposed which connects at least one commercially available base station (BTS1, BTS2) to a telecommunication network (PSTN) via standard interfaces (PCM30, Abis). The device comprises a subscriber data base (ID) and means (MM) for checking whether a transmitted subscriber identification (IMSI) authorizes a subscriber to access the radio system (PRS). The device further controls the establishment and release of calls (CC) and performs radio resource management functions (RR). A radiotelephone (MS) authorized to access the radio system (PRS) is connected to the nearest base station (BTS1) at least for the duration of the call.

9 Claims, 2 Drawing Sheets

RADIO SYSTEM FOR A CLOSED USER GROUP

TECHNICAL FIELD

The present invention relates to a radio system for a closed user group, to a device therefor and to a base station therefor.

BACKGROUND OF THE INVENTION

A radio system for a closed user group is known in Germany by the name of "Chekker". This radio system comprises several base stations which serve one radio cell each and are connected to a main system controller via "trunked system controllers" (see, for example, FIG. 6-2/2 on p.6, Chapter 6.2, in the "Mobilfunk Handbuch" by J. Kedaj et al, Neue Mediengesellschaft Ulm m.b.H., Edition May 1993). Accordingly, the "Chekker" radio system, which is designed to provide private mobile radio service within service areas with radii of about 50 km, has a complex infrastructure. A connection between a private mobile radio unit and the public telecommunication network is only possible via the main system controller.

A radio system for a closed user group which serves a small, single-cell area is described in DE 43 07 966 A1. A so-called transmission station is provided there which is connected to the public telecommunication network via switching equipment. This transmission station is similar in construction to a base station and a base station controller and, thus, complex and costly. Furthermore, the protocol executed between the transmission station and a radiotelephone is different from a standard protocol, so that the transmission stations must incorporate transceiver technology which is not standardized and, thus, cannot be procured at low cost.

DISCLOSURE OF INVENTION

It is an object of the invention to provide a radio system for a closed user group which is implemented by few and low-cost means.

According to a first aspect of the present invention, a radio system for subscribers forming a closed user group comprises radiotelephones which transmit respective subscriber identifications for establishing radio calls, at least one base station, and a device including means for connecting the at least one base station to a telecommunication network, a subscriber data base containing subscriber data for the closed user group to check whether the transmitted subscriber identification authorizes the subscriber to access the radio network, and base station control means which assign the authorized radiotelephone, at least for the duration of the radio call, to one of the base stations.

According to a second aspect of the present invention, a device for implementing a radio system for a closed user group, said radio system comprising at least one base station for radiotelephones which transmit respective subscriber identifications for establishing radio calls, said device including means for connecting the at least one base station to a communication network, a subscriber data base containing subscriber data for the closed user group to check whether the transmitted subscriber identification authorizes the subscriber to access the radio network, and base station control means which assign the authorized radiotelephone, at least for the duration of the radio call, to one of the base stations.

According to a third aspect of the present invention, a base station for implementing a radio system for a closed user group wherein radiotelephones transmit respective subscriber identifications for establishing radio calls, said base station including a device for providing the connection with a telecommunication network, said device including a subscriber data base, which contains subscriber data for the closed user group to check whether the transmitted subscriber identification authorizes a subscriber to access the radio network, and base station control means, which assign the authorized radiotelephone, at least for the duration of the radio call, to the base station.

The radio system thus includes a device by means of which at least one base station is connected to a telecommunication network. The device comprises a subscriber data base for checking subscribers' authorizations to access the radio system, and base station control means which assign an authorized subscriber to one of the base stations. Thus, the essential functions for the establishment and release of calls between a subscriber belonging to the closed user group and another subscriber connected to the telecommunication network are integrated in the device according to the invention. By means of this device, commercially available, standard base stations and commercially available, standard radiotelephones connected thereto via a wireless link, for example, can be connected to the public or a private telecommunication network. Consequently, the radio system according to the invention can be implemented with simple and low-cost equipment.

BEST MODE FOR CARRYING OUT THE INVENTION

Figure 1:
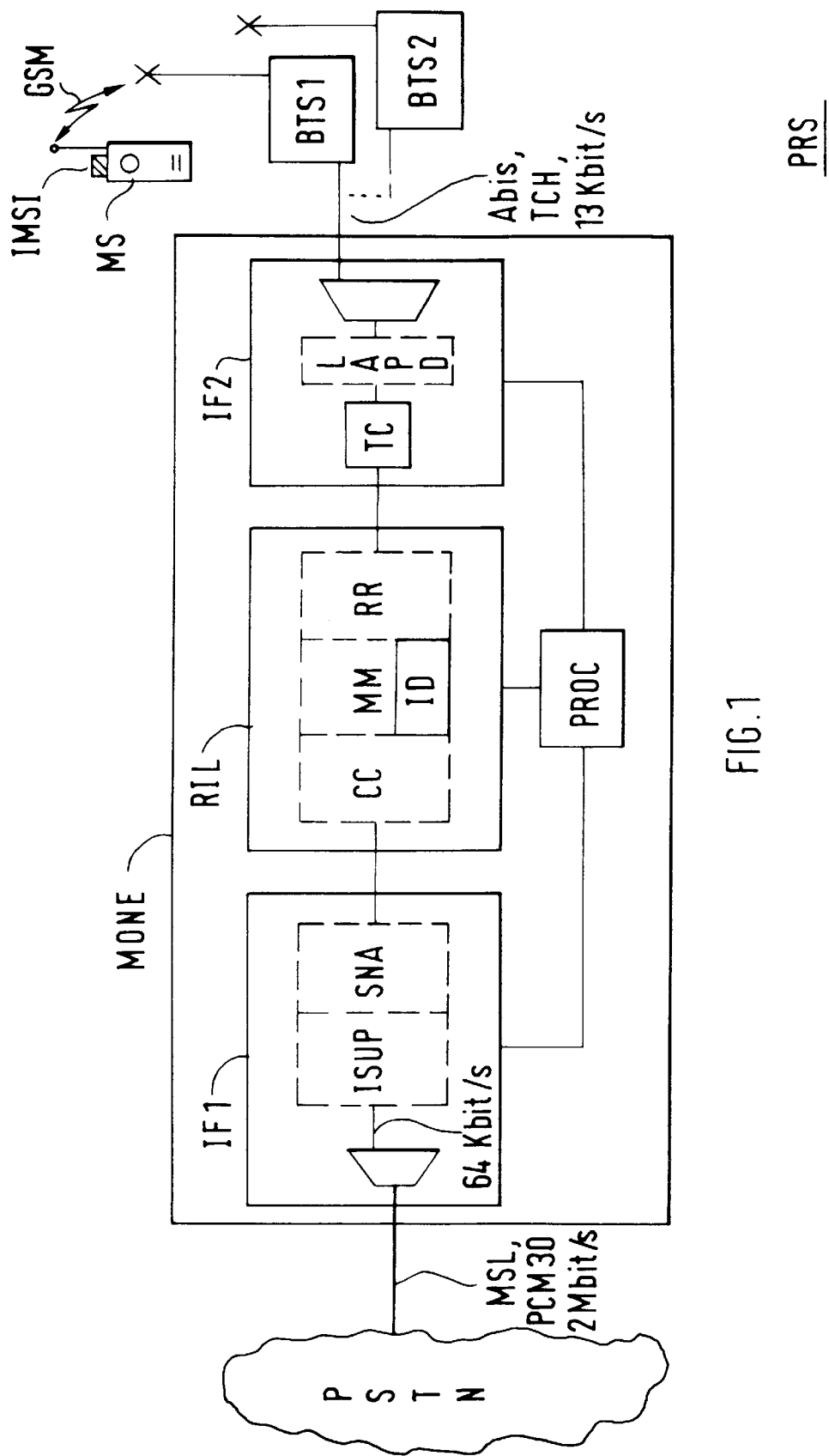
FIG. 1 shows a radio system with two base stations connected to a telecommunication network, according to the invention.

FIG. 1 shows a radio system PRS according to the invention for a closed user group. This user group may be formed, for example, by members of a private organization or a public authority.

The radio system PRS includes two commercially available base stations BTS1 and BTS2 which, in this embodiment, exchange standard protocols according to the GSM (Global System for Mobile Communications) mobile-radio standard with commercially available radiotelephones by radio. FIG. 1 shows such a radiotelephone MS, which is equipped with a device for reading authorization cards. Subscribers who belong to the closed user group have such an authorization card, on which a subscriber identification IMSI is stored, which authorizes the subscriber to access the radio network. The radiotelephone MS with the card-reading device conforms to the GSM standard and can thus also be used for the GSM mobile-radio system. A card on which both the subscriber identification IMSI for the radio system PRS and a subscriber identification for a public mobile-radio system, such as GSM, are stored is advantageous. Such an authorization card is, for example, a so-called chip card which has contact areas on both sides. Depending on which side is facing toward the contact pins of the card-reading device, the subscriber identification for the radio system or that for GSM will be read. Accordingly, the subscriber can change from the radio system to the GSM and vice versa simply by turning the card. Instead of a chip card, a chip module can be used which plugs into a chip socket provided in the radiotelephone. The card can thus be designed as a plug-in module.

The base stations BTS1 and BTS2 shown in FIG. 1 are connected to a telecommunication network, here the public switched telephone network PSTN, via a device MONE. The device MONE contains a first interface circuit IF1 for providing the connection to the telephone network PSTN via a standard e.g., 2-Mb/s PCM30 link. Furthermore, the device MONE comprises a second interface circuit IF2 for connecting the base stations BTS1 and BTS2 thereto via a GSM standard Abis link with 2×8 13-kb/s traffic channels (full rate).

The device MONE further includes a processor PROC and a processor-controlled circuit RIL between the interface circuits IF1 and IF2 which is connected with the processor PROC and incorporates a subscriber data base ID. The above components are essentially parts of a personal computer with a processor PROC of the type Intel 486 DX and a hard-disk storage of the type Maxtor 540 MB, on which subscriber data of the subscriber data base ID is stored. The subscriber data contain the names and subscriber identifications of the subscribers who belong to the closed user group.

The processor-controlled circuit RIL and the interface circuits IF1 and IF2 essentially execute functions which are indicated schematically in FIG. 1 by function blocks bordered with broken lines, and which will now be described in terms of a call initiated by a subscriber via the radiotelephone MS (mobile originated call).

To establish a call, the radiotelephone MS sends the subscriber identification IMSI on a signalling channel to the nearest base station BTS1. The latter transmits the subscriber identification within a standard protocol (e.g., GSM-LAPD) over the Abis link to the device MONE. There, the standard protocol is received and processed (see function block labeled (Link Access Procedure-D) LAPD) in the second interface circuit IF2, so that the subscriber identification IMSI can be compared in the processor-controlled circuit RIL with the subscriber identification stored in the subscriber data base ID.

To this end, the processor-controlled circuit RIL incorporates a subscriber data management MM, which monitors the storing, reading, and erasing of subscriber data and which performs the above comparison to check whether the subscriber identification IMSI authorizes the subscriber to access the radio system PRS. If that is the case, the circuit RIL will control the establishment of the call (see function block CC) by signalling to the first interface circuit IF1 the subscriber identification IMSI and the subscriber number of the desired subscriber, who is connected to the public switched telephone network PSTN.

The first interface circuit, within the scope of a subscriber number management SNA, converts the subscriber identification IMSI to a subscriber number suitable for use in the public switched telephone network PSTN. Furthermore, the first interface circuit creates a signalling protocol (see function block ISUP (ISDN System User Part)) which conforms to the ISDN standard. This signalling protocol contains the subscriber number of the calling subscriber (at the radiotelephone MS) and the subscriber number of the called subscriber (in the public switched telephone network PSTN). It is sent to an exchange of the public switched telephone network PSTN over the standard link PCM30.

When a connection has been established to the called subscriber, i.e., when the device MONE receives a message corresponding to the ringing tone, the processor-controlled circuit RIL, within the scope of a radio resource management RR, assigns an idle duplex radio channel (traffic channel) to the radiotelephone MS. Furthermore, the radiotelephone MS is assigned to the base station BTS1 for the duration of the call by maintaining the radio link on the assigned duplex channel. A channel change and hand-off of the call to another base station are not provided for. Consequently, the device MONE of FIG. 1 is very simple in construction and is especially suited for implementing a radio system (e.g., a so-called fixed cellular system) whose subscribers are constantly within one radio cell.

It is also conceivable, however, to expand the radio resource management so that even subscribers who move beyond the boundary of a radio cell will be served. In that case, the radio resource management would have to be provided with means for monitoring and handing off calls. In that case, the processor-controlled circuit RIL monitors transmission quality and, if the transmission quality drops below a predeterminable threshold, controls hand-off the call from the one base station BTS1 to another BTS2.

Besides the above-described function blocks, which serve essentially to process standard protocols (ISUP, SNA, LAPD) and to perform call control (CC), subscriber data management (MM), and radio resource management (RR) functions, the device MONE of FIG. 1 comprises the following means for adapting the user-data transmission speed to the standard interfaces PCM 30 and Abis:

Each of the interface circuits IF1 and IF2 includes a multiplexer for adapting the external transmission speeds to the internal processing speed of 64 kb/s within the device MONE, and the second interface circuit IF2 includes a transcoder TC for user-data reduction in the traffic channels TCH.

Besides controlling the establishment and release of calls between a subscriber of the radio system PRS and a subscriber of the public switched telephone network PSTN, the device MONE controls the establishment and release of calls between the subscribers of the radio system PRS (internal voice and data communication within the closed user group).

The device MONE shown in FIG. 1 is especially suited for a multicell radio system such as the radio system PRS described here. It simulates the essential functions for the network side of the radio system. Thus, the device MONE acts like a network emulator for the radiotelephones MS connected to the radio system, i.e., the radiotelephones MS can be operated in the same manner as within the standardized radio system (here GSM, for example). Besides the illustrated connection of the device MONE to an exchange of the telecommunication network PSTN, a connection to a private branch exchange connected to the telecommunication network PSTN is possible. In that case, the first interface circuit IF1 must be modified to allow protocols to be exchanged with the private branch exchange, e.g., ISDN protocols via a so-called $S_0$ interface. Furthermore, the first interface circuit IF1 may be expanded so that the device MONE can also be connected to an exchange of a mobile-radio network. In that case, IF1 would also have to process corresponding protocols, such as the so-called A-interface protocols in GSM. The device MONE would thus be suited for selectively connecting the base stations to the public switched telephone network PSTN or a mobile-radio network.

Figure 2:
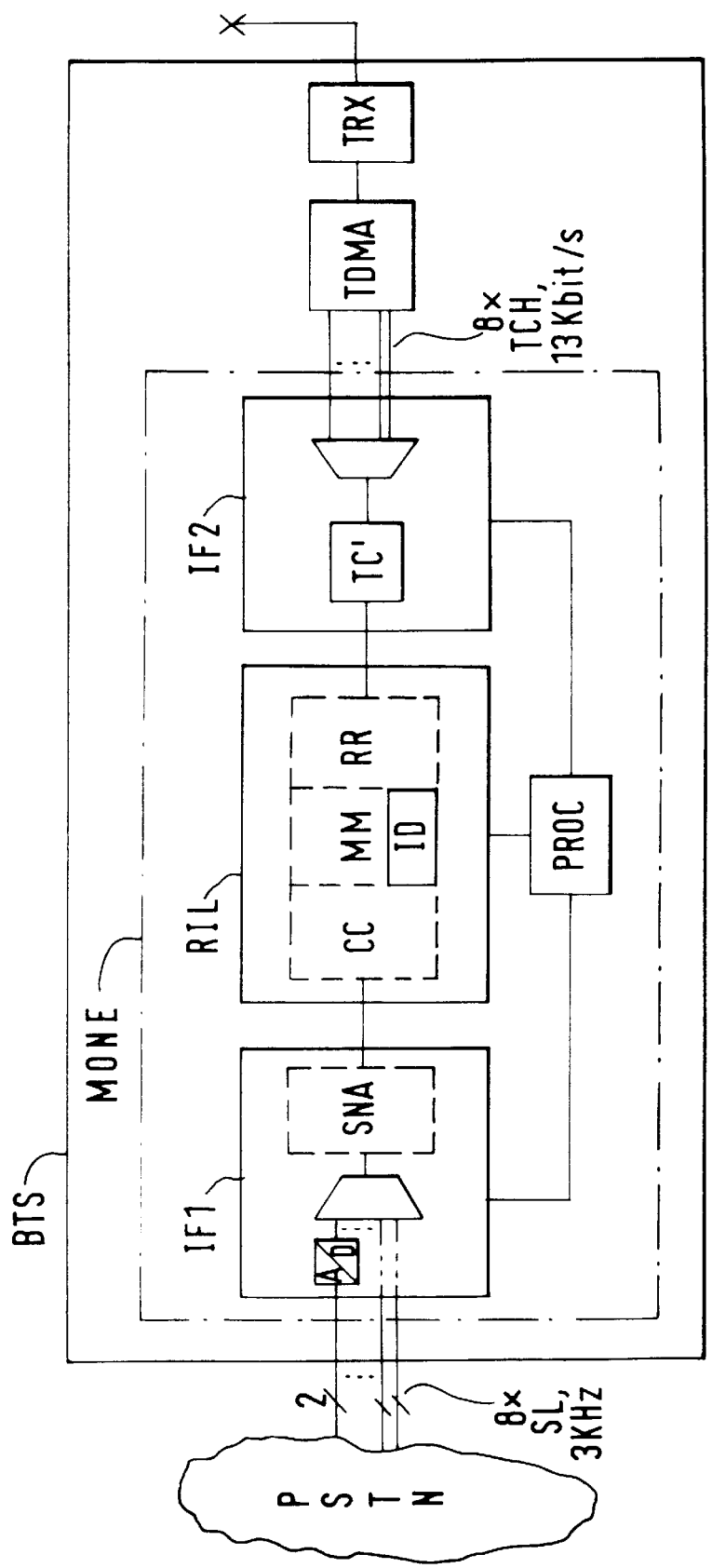
FIG. 2 shows a base station which can be connected directly to the telecommunication network, according to the invention.

FIG. 2 shows a base station BTS with a device MONE for implementing a single-cell radio system. The design of the device MONE shown in FIG. 2 differs from the above-described design of FIG. 1 essentially only in the following points:

Firstly, the device MONE is integrated with a base station BTS. Secondly, the device MONE comprises a first interface circuit IF1 which is connected to the public switched telephone network PSTN via several analog subscriber lines (2- or 4-wire lines). Thirdly, the device MONE comprises a second interface circuit IF2 which is connected directly, without means (cf. LAPD in FIG. 1) for processing a GSM standard protocol, to a base station stage TDMA for digital baseband processing, which is followed by a transceiver stage TRX.

Thus, the device MONE of FIG. 2 connects the baseband-processing stage TDMA of the base station BTS to the public switched telephone network PSTN. The device MONE is simple in construction and is integrated with the base station BTS, so that the latter can be connected directly to the public switched telephone network via analog subscriber lines SL.

In this embodiment, the device MONE connects one of the traffic channels TCH of the base stations to one of the analog two-wire lines, i.e., to one of the subscriber lines, at a time. To this end, the first interface circuit IF1 includes analog-to-digital converters and a multiplexer which is connected to the second interface circuit IF2 via the above-described function blocks SNA, CC, MM, and RR. The second interface circuit IF2 contains a transcoder TC' and a multiplexer whereby the digital traffic channels TCH—8 channels in this embodiment—are switched to the 8 corresponding analog subscriber lines SL (the transmission speed being adapted in the transcoder from 13 kb/s to 3 kHz).

The first interface IF1 can also be so designed that the device MONE seizes a multiple subscriber line (e.g., PCM30 as shown in FIG. 1) or several digital single subscriber lines (e.g., ISDN $S_0$).

It is conceivable to provide the base station BTS with a further interface circuit for providing the connection to a standard link, such as the GSM Abis. Such a base station would be suitable for implementing both a radio network according to the invention and a conventional mobile-radio network.

The embodiments described show two possibilities of how a radio system for a closed user group can be implemented at low cost. Many further possibilities, e.g., in the area of private telecommunication networks, are conceivable. Thus, although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A radio system (PRS) for subscribers forming a closed user group, comprising radiotelephones (MS) which transmit respective subscriber identifications (IMSI) for establishing radio calls, at least one base station (BTS1, BTS2), and a device (MONE) including means for connecting (IF1, IF2) the at least one base station (BTS1, BTS2) to a public switched telecommunication network (PSTN), a subscriber data management means (MM) and a subscriber data base (ID) to check by means of said subscriber data management means (MM) whether a given transmitted subscriber identification (IMSI) authorizes a subscriber access to the radio system, and base station control means (RR) which assigns an authorized subscriber with radiotelephone (MS), at least for the duration of a radio call, to one base station of the at least one base station (BTS1), wherein the radiotelephones (MS) include card-reading devices for reading authorization cards, on each of which a subscriber identification (IMSI) for the radio system (PRS) for subscribers forming said closed user group and another subscriber identification for a public mobile-radio system are stored on opposite sides thereof, wherein said cards have contact areas on both of said opposite sides and, depending on which side is facing toward contacts of the card-reading devices, said card-reading devices read said respective subscriber identifications from said cards inserted by said subscribers for the radio system for subscribers forming said closed user group or for said public mobile-radio system, wherein said subscriber database is checked against said given transmitted subscriber identification with said subscriber data management means (MM) and wherein said authorized subscriber is granted access to said closed user group or to said public mobile-radio system.

2. A radio system (PRS) as claimed in claim 1 wherein the radiotelephones (MS) and the at least one base station (BTS1, BTS2) are commercially available radiotelephones and base stations, respectively, which are usable in a public mobile-radio system.

3. A device (MONE) for implementing a radio system (PRS) for a closed user group, said radio system (PRS) comprising at least one base station (BTS1, BTS2) for radiotelephones (MS) which transmit respective subscriber identifications (IMSI) for establishing radio calls, said device (MONE) including means for connecting (IF1, IF2) the at least one base station (BTS1, BTS2) to a public switched telecommunication network (PSTN), a subscriber data management means (MM) and a subscriber data base (ID) containing subscriber data to check with said subscriber data management means (MM) whether the transmitted subscriber identification (IMSI) authorized the subscriber to access the radio system, and base station control means (RR) which assigns the authorized subscriber with radiotelephone (MS), at least for the duration of the radio call, to one base station of the at least one base station (BTS1), wherein the radiotelephones (MS) include card-reading devices for reading authorization cards, on each of which a subscriber identification (IMSI) for the radio system (PRS) for subscribers forming said closed user group and another subscriber identification for a public mobile-radio system are stored only one at a time of which is read by said card-reading device for transmission on said transmitted subscriber identification (IMSI) wherein said subscriber database is checked against said transmitted subscriber identification with said subscriber data management means (MM) and wherein said authorized subscriber is granted access to said closed user group or to said public mobile radio system.

4. A device (MONE) as claimed in claim 3 wherein the means for connecting the at least one base station (BTS1, BTS2) to the telecommunication network (PSTN) are a first interface circuit (IF1), by means of which the device (MONE) exchanges with the telecommunication network (PSTN) standard protocols (PCM 30) for the establishment and release of a multiple link (MSL) or of two or of more single links (SL), and a second interface circuit (IF2), by means of which the device (MONE) exchanges protocols, particularly standard protocols (Abis) for base station control, with the at least one base station (BTS1, BTS2).

5. A device (MONE) as claimed in claim 4, further comprising a processor-controlled circuit (RIL) including the subscriber data base (ID), said processor-controlled circuit being connected to the first and second interface circuits (IF1, IF2) and controlling a subscriber data management (MM), the establishment and release of calls (CC) between the subscribers, and the base station control means (RR).

6. A device (MONE) as claimed in claim 5 wherein the processor-controlled circuit (RIL) assigns an idle duplex radio channel and maintains the radio link to radiotelephone (MS) and to the base station (BTS) for the duration of the call implementing a fixed cellular system whose subscribers are constantly within one radio cell.

7. A device (MONE) as claimed in claim 5 wherein the processor-controlled circuit (RIL) controls the establishment and release of calls (CC) between the subscribers of the radio system (PRS).

8. A device (MONE) as claimed in claim 3 which is integrable into the base station (BTS).

9. A base station (BTS) for implementing a radio system (PRS) for a closed user group wherein radiotelephones (MS) transmit respective subscriber identifications (IMSI) for establishing radio calls, said base station (BTS) including a device (MONE) for providing the connection with a telecommunication network (PSTN), said device (MONE) including a subscriber data management means (MM) and a subscriber data base (ID), which contains subscriber data to check by means of said data management means (MM) whether the transmitted subscriber identification (IMSI) authorized the subscriber to access the radio system, and base station control means (RR) which assigns the authorized subscriber with radiotelephone (MS), at least for the duration of the radio call, to the base station (BTS), wherein the radio telephones (MS) include card-reading devices for reading authorization cards, on each of which a subscriber identification (IMSI) for the radio system (PRS) for subscribers forming said closed user group and another subscriber identification for a public mobile-radio system are stored only one at a time of which is read by said card-reading device for transmission on said transmitted subscriber identification (IMSI) wherein said subscriber database is checked against said transmitted subscriber identification with said subscriber data management means (MM) and wherein said authorized subscriber is granted access to said closed user group or to said public mobile radio system.

* * * * *